(12) United States Patent
Card et al.

(10) Patent No.: US 6,669,270 B1
(45) Date of Patent: Dec. 30, 2003

(54) TRUCK WIND DEFLECTOR

(76) Inventors: Loyd Ray Card, 4930 Rd. 3.7 NE., Moses Lake, WA (US) 98837; Helen Joyce Card, 4930 Rd. 3.7 NE., Moses Lake, WA (US) 98837

(*) Notice: Subject to any disclaimer, the term of this patent is extended or adjusted under 35 U.S.C. 154(b) by 0 days.

(21) Appl. No.: 10/165,826

(22) Filed: Sep. 5, 2002

(51) Int. Cl.$^7$ .............................. B60J 9/04; B62D 35/00
(52) U.S. Cl. .............................. 296/180.1; 296/180.2; 296/180.4
(58) Field of Search .................... 296/180.1, 180.2, 296/180.4; 180/903; 280/850, 857

(56) References Cited

U.S. PATENT DOCUMENTS

| | | | |
|---|---|---|---|
| 3,529,862 A | | 9/1970 | Jousserandot |
| 3,797,879 A | * | 3/1974 | Edwards ................ 296/1 S |
| 3,799,603 A | | 3/1974 | Bott |
| 3,861,735 A | * | 1/1975 | Taylor ................... 296/1 S |
| 3,904,236 A | | 9/1975 | Johnson |
| 3,972,556 A | * | 8/1976 | Mason, Jr. .............. 296/1 S |
| 4,141,580 A | * | 2/1979 | Ivan ...................... 296/1 S |
| 4,421,354 A | * | 12/1983 | Lemaster ................ 296/1 S |
| 4,585,263 A | | 4/1986 | Hesner |
| 4,624,497 A | * | 11/1986 | Tassin .................... 296/1 S |
| 4,629,241 A | * | 12/1986 | Gruich ................... 296/1 S |
| 4,818,015 A | * | 4/1989 | Scanlon ................ 296/180.1 |
| 5,069,498 A | | 12/1991 | Benchoff |
| D332,245 S | | 1/1993 | Powell, Jr. |
| 5,332,280 A | * | 7/1994 | DuPont et al. ......... 296/180.1 |
| 5,454,619 A | | 10/1995 | Haraway |
| 5,538,315 A | * | 7/1996 | Dixon .................. 296/180.4 |
| 5,722,714 A | | 3/1998 | Vallerand |
| 6,267,434 B1 | * | 7/2001 | Casillas ................ 296/180.1 |
| 6,467,833 B1 | * | 10/2002 | Travers ................ 296/180.4 |
| 6,485,087 B1 | * | 11/2002 | Roberge et al. ........ 296/180.4 |

FOREIGN PATENT DOCUMENTS

| JP | 402144264 | * | 6/1990 | .............. 296/180.1 |
|---|---|---|---|---|

* cited by examiner

*Primary Examiner*—Joseph D. Pape
*Assistant Examiner*—H. Gutman
(74) *Attorney, Agent, or Firm*—Richard L. Mikesell

(57) ABSTRACT

An airfoil, triangular in cross-section, is mounted at or near the rear of the truck, perpendicular to the ground with the hypotenuses of the triangle being the leading edge of the airfoil. The airfoil stabilizes the truck from air blasts caused by passing vehicles.

6 Claims, 1 Drawing Sheet

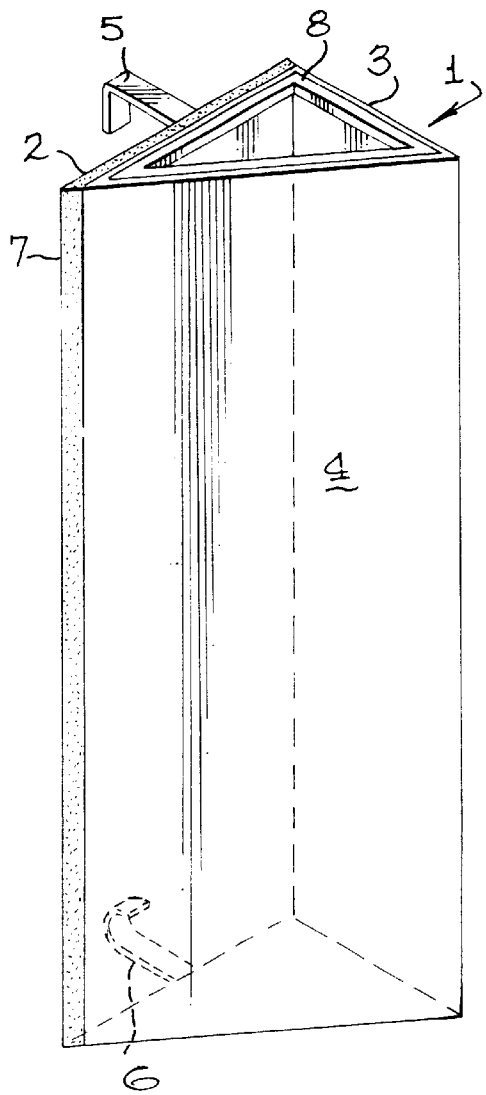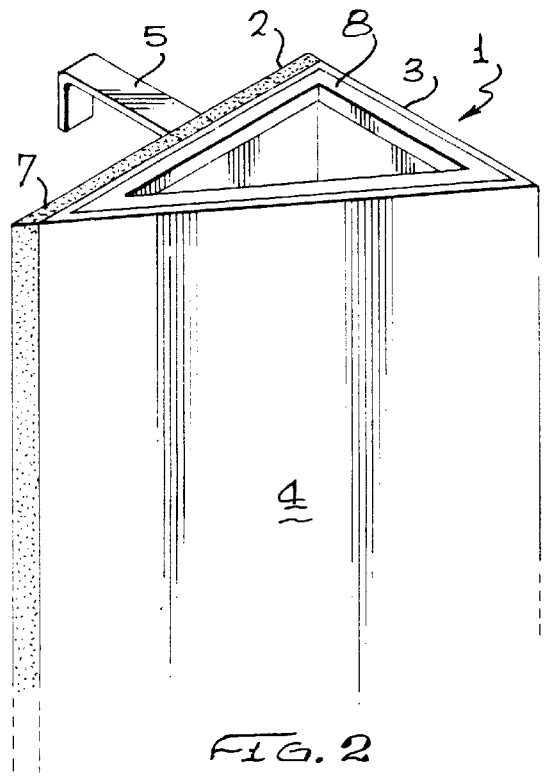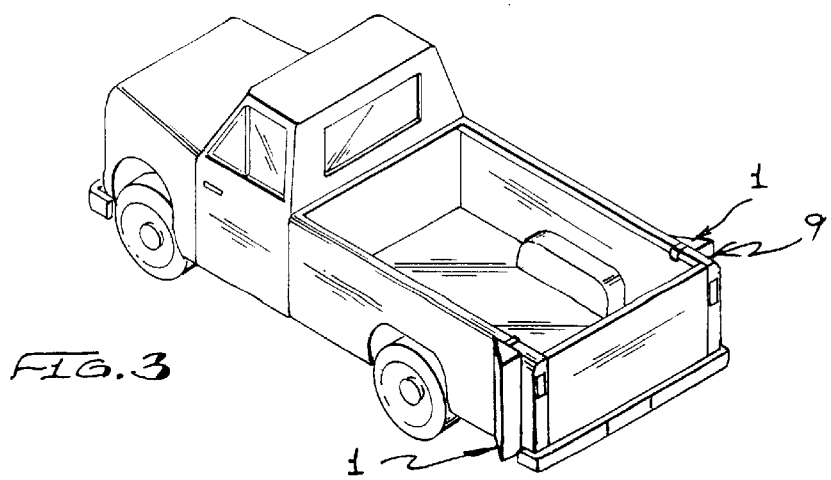

TRUCK WIND DEFLECTOR

BACKGROUND OF THE INVENTION

The present invention generally relates to a device for mounting on both sides of the end of a pickup truck as a vertical wind deflector. In the prior art, many vehicle wind deflectors are shown. However, their purpose is chiefly to make the vehicle on which they are mounted more aerodynamic. That is, they aid the flow of air making the forward movement of their vehicle more efficient. For instance, U.S. Pat. No. 5,722,714 to Vallerand shown a wind deflector for pickup trucks, mounted in the bed of the truck perpendicular to the lengthwise axis of the truck, and parallel to the width. It is said to make the aerodynamics of the truck better, presumably saving fuel. U.S. Pat. No. 5,069,498 has a similarly aligned deflector, accomplishing the same energy saving. U.S. Pat. No. 4,585,263 to Hesner achieves much the same effect. The problem that these deflectors or air foils do not address, nor attempt to, is the effect on the stability of a pickup truck, caused by the sideways blast of air from a large passing vehicle, such as a semi-truck and trailer, or an "eighteen wheeler". This effect is especially evident on a small pickup, or Light Utility Vehicle The deflectors in the prior art, being only directed so as to affect air that is flowing parallel to the lengthwise axis of the truck, are unaffected by, and do not affect, air blowing perpendicular to the lengthwise axis of the truck, parallel to the width of the truck. That is the direction that a blast of air comes from when a large vehicle, such as an eighteen wheeler, passes a pickup truck.

SUMMARY OF THE INVENTION

The airfoil of the instant invention is of a general wedge shape, with a height greater than the widest side dimension and is disposed in a vertical position at or near each rear corner of the pickup truck. The foil on the driver's side is the most critical, as it is the one that will most often receive the blast of air from a passing large vehicle. On the other side of the vehicle, another foil is desirably disposed, both for reasons of energy symmetry when the pickup is traveling without side blasts, that is, with only the front-to-rear air flow generated by the forward motion of the pickup truck, and for the few occasions when the pickup truck is passed on the right by a large vehicle.

BRIEF DESCRIPTION OF THE DRAWINGS

Referring now to the drawings:

FIG. 1 is a front perspective of a vertical air foil or deflector of the type of the instant invention;

FIG. 2 is a detail of the vertical air foil or deflector of FIG. 1;

FIG. 3 shows a typical pickup truck with the foil or deflector mounted vertically on the driver's side;

DETAILED DESCRIPTION OF THE INVENTION

Referring now to the drawings wherein like reference numbers denote like elements throughout the three views, FIG. 1 shows a deflector 1 of the instant invention. It comprises a mounting side 2, a trailing side 3, and a deflecting side 4. The mounting side 2 is preferably flat or of a shape to mount snugly against the pickup truck bed (not shown in FIG. 1). The trailing side 3 is shown as flat, but its particular shape is not critical to the invention. A flat surface is easier to manufacture, but for esthetic reasons, a concave or convex surface could be chosen, and would work as well. The deflecting side 4 is the working surface; the surface that deflects a blast of air perpendicular to the lengthwise axis of the truck away from the truck, lessening the side forces on the truck. Again, the deflecting side 4 is shown as a plane, but for esthetic reasons, a concave or slightly convex surface would also be suitable. The deflector 1 of FIG. 1 is shown as one to be mounted on the driver's side of the pickup truck. It comprises a top mounting bracket 5, and a bottom mounting bracket 6. It can be seen that in the particular deflector configuration shown, without the mounting brackets 5 and 6, the deflector 1 could be inverted, and would be thus suitable for mounting on the passenger side of the vehicle, assuming appropriate mounting brackets were attached to it. The mounting brackets 5 and 6 shown are of a hook configuration, but other means of attaching the deflector 1 to the pickup truck will be apparent to those skilled in the art.

Turning now to FIG. 2, a more detailed view of a deflector section is shown. In it, the rear surface 2 is shown as layered, representing a soft plastic portion 7 which would be the surface in contact with the truck, thereby protecting the finish of the truck, and a more substantial portion 8, providing structural strength to the deflector 1. Also, it will be noted that the deflector 1 is shown as hollow. This configuration is not necessary, but it has been found that that of course makes it lighter.

Turning now to FIG. 3, a typical mounting of two of the deflectors on a pickup truck is shown. Ideally, they are of sufficient height to extend from at least the top of the bed to the bottom of the bed of the pickup truck, but may extend further down. Ideally, they are mounted so that their trailing side 3 is flush with the rear surface 9 of the pickup truck bed.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. An airfoil for a pick-up truck having a cab and a bed, the bed being defined by lateral sidewalls extending from the cab to a rear end of the bed, the airfoil comprising:
   an elongated deflector of generally right triangular cross-section; and
   mounting brackets adapted to attach the deflector to an outer surface of one of said lateral sidewalls between a rear wheel of the pick-up truck and the rear end of the bed.

2. The airfoil of claim 1, wherein the deflector is mounted to the sidewall such that the deflector extends from an upper edge of the sidewall to a lower edge of the sidewall.

3. The airfoil of claim 1, including a second deflector mounted to the opposing one of said lateral sidewalls with mounting brackets between an opposite rear wheel and the rear end.

4. The airfoil of claim 1, wherein the deflector is mounted adjacent to the rear end of the bed.

5. The airfoil of claim 1, including a protective layer disposed between the deflector and the outer surface of the sidewall.

6. The airfoil of claim 5, wherein the protective layer comprises a pad fixed to the deflector.

* * * * *